United States Patent [19]
Johanson et al.

[11] 4,112,480
[45] Sep. 5, 1978

[54] TUNABLE EXTENDED RANGE CHIP CAPACITOR

[75] Inventors: Norman E. Johanson, Boonton, N.J.; Emil Seidler, Burbank, Calif.

[73] Assignee: Johanson Manufacturing Corporation, Boonton, N.J.

[21] Appl. No.: 814,059

[22] Filed: Jul. 8, 1977

[51] Int. Cl.² .................... H01G 5/06; H01G 1/00
[52] U.S. Cl. ...................... 361/271; 361/293
[58] Field of Search .................. 361/271, 293

[56] References Cited

U.S. PATENT DOCUMENTS

| | | | |
|---|---|---|---|
| 2,475,144 | 7/1949 | Kodama | 361/293 |
| 3,694,710 | 9/1972 | Kirschner | 361/271 X |

FOREIGN PATENT DOCUMENTS

| | | | |
|---|---|---|---|
| 615,146 | 6/1935 | Fed. Rep. of Germany | 361/271 |

*Primary Examiner*—E. A. Goldberg
*Attorney, Agent, or Firm*—James J. Cannon, Jr.; James J. Cannon

[57] ABSTRACT

A tunable, extended range, multilayered ceramic chip capacitor for incorporation into a plurality of substrate designs of micro-miniature circuitry and hybrid integrated circuits, comprising a multilayered ceramic chip capacitor; said chip having an electrode pattern as both upper and lower electrode layers embedded within the dielectric, forming a homogeneous chip capacitor structure. The capacitance range of the said chip capacitor is extended by the addition of a rotor plate positioned over a portion of said electrode pattern by a rotor contact spring which also provides a rotor contact terminal, such that said rotor plate may be rotated over the stator portion of said electrode pattern to provide a precisely tunable extended range of capacitance, a stator terminal spring to provide means to grip said extended range chip capacitor and means for circuit connection.

3 Claims, 3 Drawing Figures

TUNABLE EXTENDED RANGE CHIP CAPACITOR

BACKGROUND OF THE INVENTION

The present invention relates to variable or adjustable ceramic chip capacitors, having an extended tunable range, and is directed particularly to improvements in the structure of miniature adjustable capacitors, for incorporation into a plurality of substrate designs of micro-miniature circuitry, such as those found in the timing control circuitry of electronic watches. Simplicity of design results in only four parts, a chip capacitor, a rotor, and two terminal retaining springs.

DESCRIPTION OF THE PRIOR ART

The present invention represents a significant advance in the current state of the art of variable or adjustable micro-miniature capacitors. Objects of the present invention include compactness of structure, reliability in performance, simplicity of assembly, and low cost of manufacture. The present apparatus may readily be incorporated into a broad range of substrate designs of micro-miniature circuitry and hybrid intergrated circuitry.

Normally a chip capacitor has a fixed capacitance value. In the prior art many attempts have been made to either extend the range of a chip capacitor or vary its capacitance. One such technique is disclosed in U.S. Pat. No. 3,694,710. In the device of this patent an external counterelectrode is formed by a metallic deposition on one exterior surface of a ceramic chip capacitor. The chip capacitor is varied, or rather decreased, in capacitance by grinding away portions of the counterelectrode surface. This is a cumbersome and inaccurate method of decreasing the capacitance of a chip capacitor.

The prior patent art also teaches two related ways of extending the capacitance of a chip capacitor in incremental steps. In the first technique, a number of electrode layers of varying size are embedded in a multilayer ceramic capacitor but are not connected to any terminal. Provisions for connection of these layers are provided. The user then connects the layer which provides the extended capacitance closest to his requirements. Such a chip capacitor thus has an extended range, but is not tunable over that range. Its range is simply extended in fixed increments. In the second technique, a plurality of embedded co-planar metallized strips running perpendicular to the electrodes of a chip capacitor are provided with external contact terminals. By connecting one or more of these strips, the range of capacitance of the chip may be increased in fixed increments.

In contrast to the prior art methods, the device of the present invention provides a means to extend the range of capacitance of a chip capacitor and to precisely tune the extended range, increasing or decreasing the capacitance values over the extended range by a simple user adjustment.

Performance has been improved, due in part to a limitation in the number of component parts, only four in present invention, which leads to a marked reduction in the likelihood of mechanical failure caused by vibration or physical shock over extended periods of time. Due to the simplicity of construction and the small number of component elements, manufacture of the capacitor is also relatively easier with the chances of component failure being significantly reduced. This structural integrity, therefore, enhances the reliability of the circuits incorporating the present variable capacitor. This invention allows for extremely fine adjustable tuning capabilities and the invention may be incorporated into substrate designs without any extraneous insulating material.

SUMMARY OF THE INVENTION

The tunable, extended range multilayered chip capacitor of the present invention is designed to be incorporated into a wide range of substrate designs of microminiature circuitry, and hybrid intergrated circuits. A multilayered ceramic chip capacitor comprises a number of co-planar metallized layers embedded in a dielectric material, usually ceramic, the layers being alternately connected to one or the other metallized ends. With the exceptions noted above, such chip capacitors have a fixed capacitance value. The present invention provides a means to extend that fixed capacitance and precisely tune the capacitor over the extended range.

The present invention is comprised essentially of four basic components: a multilayered chip capacitor, having an inactive electrode pattern embedded therein; a highly conductive rotor having an extending blade plate; a rotor contact spring; and a stator end retaining spring. The multilayered ceramic chip capacitor used in the present invention has a plurality of alternating ceramic dielectric and embedded metallic electrode layers, as well as outer termination points on the oppositely opposed end surfaces of said chip, which electrically connect the alternate inner electrode layers. The top and bottom embedded metallized layers are an electrode pattern, one portion of which will serve as a stator electrode. The present design allows manual rotation of the rotor blade over a portion of an electrode pattern serving as a stator, resulting in an adjustment of the capacitance.

The tunable extended range multilayered chip capacitor of the present invention incorporates an electrode pattern embedded as both top and bottom electrode layers, forming a part of the homogeneous chip capacitor structure. An adjustable rotor blade is anchored by the use of a rotor contact spring to the top of said chip, said spring applying a downward and inward pressure to the rotor, thereby causing the rotor blade to contact the upper dielectric surface of the chip capacitor with a uniformly distributed pressure. The rotor contact spring also centralizes the motion of the rotor to enable a positive concentric rotation of said rotor blade, and further serves to provide an electrical contact of the rotor blade to the alternate electrodes connected to one metallized end of the chip capacitor. The rotation of the rotor plate results in a movement of the rotor plate over an electrode pattern serving as the stator plate, thereby resulting in an extension of the capacitance of the chip capacitor, the amount of such extension being a function of the area of overlap between the rotor blade and the stator electrode pattern and the thickness of the dielectric between the rotor blade and the stator pattern. Controlling the degree of rotation of the rotor blade plate over the stator plate electrode pattern provides a means to tune precisely the extended range of capacitance.

The stator electrode pattern is symmetrical on both halves of the upper and lower metallized electrode layers of the chip capacitor. This symmetrical pattern is utilized to simplify the subsequent assembly of the tunable extended range chip capacitor. Since the electrode pattern is inactive electrically, the rotor plate may be held in position by its retaining spring on either side and on either end of the chip.

DESCRIPTION OF THE PREFERRED EMBODIMENT

Figure 1:
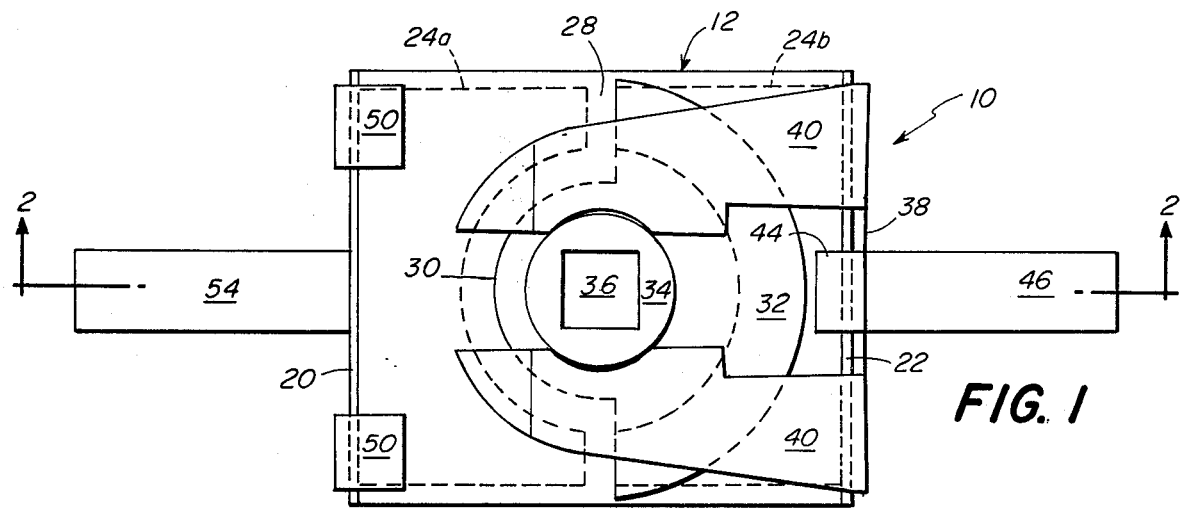
FIG. 1 is a top view of the tunable extended range chip capacitor of the present embodiment.
Figure 2:
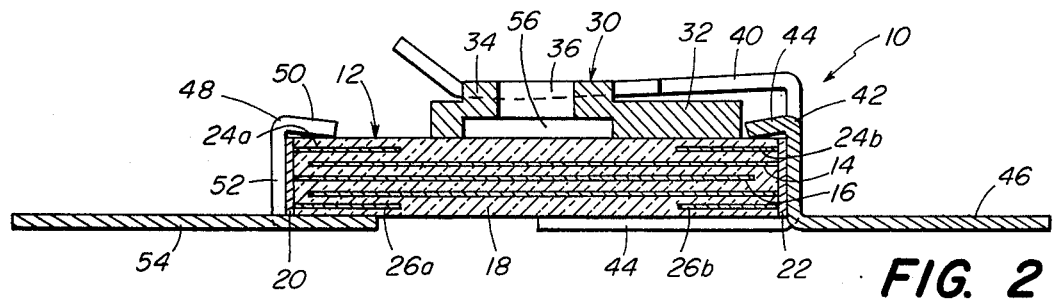
FIG. 2 is a vertical cross-sectional view of the tunable extended range chip capacitor of the present invention taken along the line 2 — 2 of FIG. 1.
Figure 3:
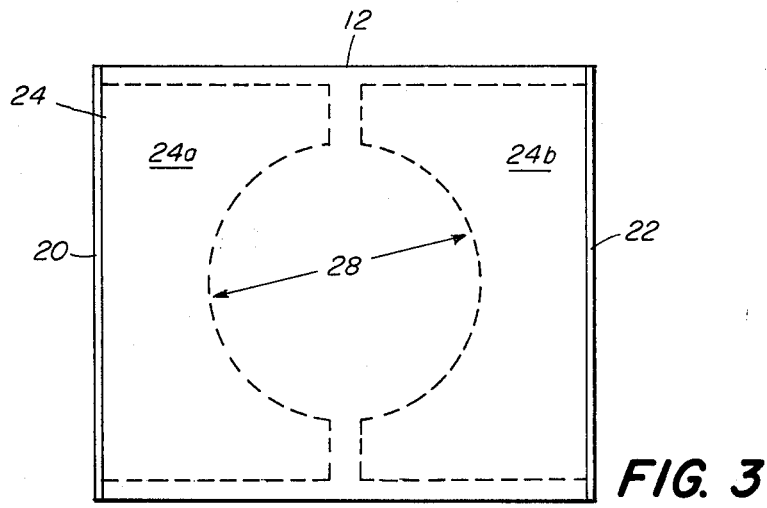
FIG. 3 is a top view of the multilayered chip capacitor of the present invention showing in outline the stator electrode pattern.

Referring now to the drawings and in particular to both FIGS. 1 and 2, the tunable extended range chip capacitor of the present invention is generally designated by the reference numeral 10. Capacitor 10 comprises a nearly standard multilayer chip capacitor 12 having a plurality of metallic electrodes, 14, 16, embedded within a dielectric material 18, usually ceramic, said metallic electrodes 14, 16 being co-planar and being connected alternately to each metallized terminal end 20, 22 of chip capacitor 12. However, chip capacitor 12 differs from a standard chip capacitor in that it has two additional electrode layers 24, 26 embedded within the dielectric of chip capacitor 12 as the upper and lower metallic electrode layers thereof. Electrode layers 24, 26, indicated in dotted lines in FIGS. 1 and 3, are basically stator electrode patterns which perform no electrical function in chip capacitor 12, but which are in contact with each metallized end 20, 22 of chip capacitor 12. Each stator electrode pattern 24, 26 is divided into two sections, 24a, 24b and 26a, 26b respectively, split at the middle with a central circular gap 28. In the configuration just described, chip capacitor 12 has a fixed capacitance value, and electrode patterns 24, 26 are electrically inactive.

To extend the capacitance range of chip capacitor 12, a rotor 30 having an outwardy extending plate 32 and electrically connected to one metallized terminal 22 of chip capacitor 12 may be rotated over one of electrode patterns 24a, electrically connected to the opposite terminal 20 of chip capacitor 12, said electrode pattern 24a thus serving as a stator electrode. As rotor blade 32 overlaps a portion of the stator electrode 24a, the capacitance of chip capacitor 12 is extended to a finitely tunable degree. To accomplish this objective, a metallic rotor 30 having a generally circular shape, having a vertically extending hub 34 and having a semi-circular blade portion 32 extending therefrom is positioned over the center of chip capacitor 12. The circular base of rotor 30 overlies the circular gap 28 of electrode patterns 24a, 24b as shown in FIG. 1. The semi-circular blade portion 32 of rotor 30 extends over electrode pattern 24b, as shown in FIG. 1. In the center of rotor hub 34, there is located a square adjustment opening 36, used for rotating rotor 30. Rotor 30 is secured in a set tuning position by a rotor contact spring 38 which has horizontally extending arms 40, each arm 40 being contoured to grip the circular hub of rotor 30 by means of an arcuate cut-away portion of slightly less diameter than the diameter of said rotor hub 34, thus exerting an inward spring-like pressure on rotor 30 to hold rotor 30 in position. Rotor contact spring 38 also has an integral vertically extending portion 42 which contacts one metallized end 22 of chip capacitor 12, an integral tab portion 44 which grips the top and bottom of chip capacitor 12, and an extension 46 from said rotor contact spring 38 which serves as the rotor terminal connection. Rotor contact spring 38 serves to position rotor 30 while gripping end 22 of chip capacitor 12. To provide a secure grip of rotor 30, arms 40 are bent downward slightly toward rotor hub 34 and beyond rotor hub 34 their ends are bent upwards, to achieve a downward spring effect and insure that rotor plate 32 is co-planar with the electrode pattern 24. As shown in FIG. 1, the rotor plate 32 extends over electrode pattern 24b, both of which are connected to metallized end 22 of chip capacitor 12. In this position, there is no capacitance between rotor plate 32 and electrode pattern 24b. A stator retaining spring 48 is positioned about the opposite metallized end 20 of chip capacitor 12. Stator retaining spring 48 has two horizontally extending arms 29 which grip the top of chip capacitor 12, an integral vertical portion 52 which contacts metallized end 20, a horizontal arm portion 54 which grips the base of chip capacitor 12, and extends outwardly as the stator terminal to provide an electrical contact.

FIGS. 1 and 2 show the components just described in a top view and a cross-sectional view respectively.

FIG. 3 is a top view showing the electrode pattern 24 in outline, said electrode pattern 24 being embedded in chip capacitor 12 as its upper and lower electrode layers. Each rectangular metallic electrode pattern 24a, 24b, 26a, 26b, has a semi-circular cut-out 28 slightly greater in diameter than the circular base of rotor 30. Of the four electrode patterns 24a, 24b, 26a, and 26b, one will function as a stator electrode when connected to a circuit and when connected rotor blade 32 is rotated over that specific electrode pattern.

Thus, tunable extended range chip capacitor 10 of the present invention has four basic parts, a chip capacitor 12 having additional electrode patterns 24, 26 as its upper and lower electrode layers; a rotor 30 having a semi-circular rotor blade 32 positioned above one electrode pattern; a rotor retaining spring 38 with a terminal connection 46 to retain the rotor on one surface of the chip capacitor 12 and connect it electrically to one metallized end 22 of chip capacitor 12; and a stator retaining spring 48 to grip the opposite metallized end 20 of chip capacitor 12 and provide a stator electrical connection 54.

To extend the range of capacitance of capacitor 10, a tool bit is inserted into square rotor hole 36 and the rotor blade 32 is rotated to position a portion or all of rotor blade 32 over metallized electrode pattern 24a, the resulting configuration of the overlaping opposed electrodes results in an alteration of the capacitance. The inherent symmetry of the present invention relating to the co-planar configuration of the stator electrode patterns 24, 26 also serves as an aid to the assembly of the adjustable capacitor 10 from the multilayered ceramic chip capacitor body.

Also seen in FIG. 2 are the two outer metallized terminals 20 and 22, that are situated on the oppositely-opposed and parallel exterior sides of the chip capacitor 12. The outer terminals 20 and 22 are electrical extensions of the alternating inner electrode layers 14 and 16. The said alternately charged inner electrode layers 14 and 16 are embedded within the dielectric material 18, co-planarly and parallel with respect to each other, as well as top and bottom surfaces of the said chip capacitor 12.

The outer terminals 20 and 22 are in intimate electrical contact with the vertical metallic sections 52, 42, respectively, of the stator retaining spring 48, and rotor contact spring 38. The stator retaining spring 48 serves both as a means to anchor the stator side of the chip capacitor 12 to the substrate circuit, as well as to provide the electrical contact means between stator terminal projection 54, and stator outer terminal 20. Stator projection terminal 54 is the lower outwardly-projecting horizontally-oriented extension of the stator retaining spring 48. The stator projection terminal 54 serves to ensure electrical contact with the substrate circuit that the tunable capacitor 10 is incorporated within.

Rotor terminal projection 46 is the lower horizontally-oriented, outwardly-projecting extension of the rotor contact spring 38. The rotor terminal projection 46 serves also as the electrical contact with the substrate circuit that the present tunable capacitor 10 is incorporated within.

Rotor adjustment opening 36 is a square-shaped opening that is situated centrally within the rotor hub 34. The adjustment opening 36 is designed to allow entrance for a special rotor adjusting tool, that is to be used when varying the capacitance of the present invention. A screw-driver-like dielectric tool having a complementing square bit is inserted into recess 36 for the purpose of turning rotor hub 34 and attached rotor blade 32 with respect to the remainder of capacitor 10, and thereby varying or tuning capacitance. This technique permits a fine tuning capability over the entire extended tuning range of capacitor 10. The capacitance level is dependent upon the design of the rotor blade plates 32 and stator electrode patterns 24, 26, the discharge distance through the dielectric, and whether or not the capacitor is grounded. Rotor 30 will preferably be constructed of a highly conductive material.

Situated inferiorly to the adjustment opening 36 and concentric therewith, is an extension 56 of the adjustment opening 36. This extension hole clearance 56 serves to provide the mechanical clearance needed in the present embodiment when adjustment of the rotor means 30 is carried out.

While the outside periphery of chip capacitor 12 is illustrated as being square-shaped in configuration, this design shape may be replaced by any preferred multisided or circular contour. Other multisided means which will facilitate the orientation of the said variable capacitor for assembly purposes, as well as for the application of metallic surface coatings thereto, may be anticipated.

While I have illustrated and described herein only one form in which my invention can conveniently be embodied in practice, it is to be understood that this his form is given by way of example only and not in a limiting sense. The invention, in brief, comprises all the embodiments and modifications coming within the scope and spirit of the following claims.

We claim:

1. A tunable, extended range multilayered ceramic chip capacitor comprising:

a multilayered chip capacitor having upper and lower base surfaces and two metallized terminal ends, and having a fixed capacitance value;

a plurality of metallized electrode patterns embedded within said chip capacitor and oriented parallel to and in near proximity to the upper and lower surfaces of said chip capacitor, as the upper and lower electrode layers therein;

said electrode patterns being symmetrically disposed with each pattern being in contact with one metallized terminal end of said chip capacitor and spaced apart from any other pattern in the same layer;

a metallic rotor having a central circular hub and a rotor blade emanating from said hub, the outer perimeter of said blade terminating short of one terminal end of said chip;

said rotor having a square opening in its hub for insertion of a tool bit to turn said rotor;

said rotor being centrally positioned over the upper surface of said chip capacitor such that the central hub of said rotor does not overlap an embedded electrode pattern in the upper electrode layer;

a rotor contact spring having two spaced apart, horizontally extending arms having circular cut-outs to grip the hub of said rotor, said cut-outs having a diameter slightly less than the diameter of said rotor hub, to exert an inward pressure on said rotor, said arms being inclined inwardly and downwardly toward said hub and upwardly beyond said hub to effect a downward pressure on said rotor, resulting in a uniformly distributed contact between the lower surface of said rotor and the upper surface of said chip capacitor;

said rotor contact spring having a vertical portion to grip a metallized terminal end of said chip capacitor, inwardly extending tab portions to grip the upper and lower surfaces of said chip capacitor, and an outwardly extending portion to serve as a terminal connection;

said rotor contact spring serving to anchor said rotor in position and provide an electrical connection to one terminal end of said chip;

a second spring clip having horizontal tabs to grip the upper and lower surfaces of the outer terminal end of said chip, a vertical portion to provide electrical connection to the metallized terminal end and an outward extending portion to provide a terminal contact; said second spring clip serving as a stator spring clip;

the range of said capacitor being extended and tunable by the rotation of said rotor blade over a portion of the electrode pattern connected to the terminal end opposite that to which said rotor is connected.

2. The capacitor of claim 1 wherein said rotor blade is semicircular in shape.

3. The capacitor of claim 1 wherein four metallized electrode patterns are embedded in said chip capacitor, two forming the upper electrode layer and two forming the lower electrode layer thereof, each of said patterns in one layer being spaced apart such that said rotor hub does not overlap either of said patterns.

* * * * *